(12) United States Patent
Déjean

(10) Patent No.: US 9,189,461 B2
(45) Date of Patent: *Nov. 17, 2015

(54) PAGE FRAME AND PAGE COORDINATE DETERMINATION METHOD AND SYSTEM BASED ON SEQUENTIAL REGULARITIES

(71) Applicant: Xerox Corporation, Norwalk, CT (US)

(72) Inventor: Hervé Déjean, Grenoble (FR)

(73) Assignee: Xerox Corporation, Norwalk, CT (US)

( * ) Notice: Subject to any disclaimer, the term of this patent is extended or adjusted under 35 U.S.C. 154(b) by 246 days.

This patent is subject to a terminal disclaimer.

(21) Appl. No.: 13/943,263

(22) Filed: Jul. 16, 2013

(65) Prior Publication Data

US 2015/0026558 A1    Jan. 22, 2015

(51) Int. Cl.
| G06F 17/00 | (2006.01) |
| G06F 17/21 | (2006.01) |
| G06K 9/62 | (2006.01) |
| G06K 9/72 | (2006.01) |
| G06F 17/22 | (2006.01) |
| G06K 9/00 | (2006.01) |

(52) U.S. Cl.
CPC ........... *G06F 17/217* (2013.01); *G06F 17/212* (2013.01); *G06F 17/2288* (2013.01); *G06K 9/00463* (2013.01); *G06K 9/6219* (2013.01); *G06K 9/723* (2013.01); *G06K 2209/01* (2013.01)

(58) Field of Classification Search
CPC .......................................... G06T 7/007–7/009
See application file for complete search history.

(56) References Cited

U.S. PATENT DOCUMENTS

| 7,937,653 | B2 | 5/2011 | Déjean et al. |
| 8,340,425 | B2 | 12/2012 | Déjean et al. |
| 2011/0145701 | A1 | 6/2011 | Déjean et al. |
| 2012/0079370 | A1 | 3/2012 | Déjean |
| 2012/0317470 | A1 | 12/2012 | Déjean |

OTHER PUBLICATIONS

U.S. Appl. No. 13/288,109, filed Nov. 3, 2011, Déjean.
U.S. Appl. No. 15/911,452, filed Jun. 6, 2012, Déjean.
U.S. Appl. No. 13/530,141, filed Jun. 22, 2012, Déjean.
Galle, Matthias, Feb. 15, 2011, "Searching for Compact Hierarchical Structures in DNA by Means of the Smallest Grammar Problem", 143 pages, Universite de Rennes 1.

*Primary Examiner* — Keith Bloomquist
(74) *Attorney, Agent, or Firm* — Fay Sharpe LLP

(57) ABSTRACT

Disclosed is a method that generates a page frame structure associated with a sequentially-ordered set of pages, each being characterized by a set of page frame features. N-grams (sequence of n features) are computed from a set for n contiguous pages, and n-grams which are repetitive (Kleene cross) are selected. Pages matching the most frequent repetitive n-ram are grouped together under a new node, and a new sequence is created. The method is iteratively applied to this new sequence. The output is an ordered set of trees.

25 Claims, 16 Drawing Sheets

PAGE FRAME AND PAGE COORDINATE DETERMINATION METHOD AND SYSTEM BASED ON SEQUENTIAL REGULARITIES

CROSS REFERENCE TO RELATED PATENTS AND APPLICATIONS

U.S. patent application Ser. No. 13/911,452, filed Jun. 6, 2013, entitled "METHODS AND SYSTEMS FOR GENERATION OF DOCUMENT STRUCTURES BASED ON SEQUENTIAL CONSTRAINTS", by Hervé Déjean, is incorporated herein by reference in its entirety.

BACKGROUND

The exemplary embodiment relates to document processing. It finds particular application in connection with a system and method for the unsupervised detection of page frames applicable to a given document.

To enable processing of a book in digital form, it is often necessary to scan a hardcopy book. The pages can then be OCR processed or otherwise analyzed digitally. One problem which arises is that when a page of a book is scanned or photocopied, there is often what is referred to as noise in addition to the content of the current page. The noise may be "textual noise," which in the present context is content of a neighboring page, i.e. a page which is previous or subsequent to the current page being scanned. The textual noise may be text content or, in some cases, image content. Additionally, there may be "non-textual noise" which is generally noise which does not arise from the content of the current or neighboring pages. Non-textual noise can include, for example, black borders around the document page and speckles, often arising from the spine, which creates a shadow in the margin between the current page and the neighboring page.

It is desirable to remove such noise before further processing of the scanned document pages. Various methods have been developed for identifying what is referred to as the "page frame", also called the "page body" or by typographers, "type area". These methods include filtering out non-textual noise and identification of connected components. The aim of many of these approaches is generally to identify "the smallest rectangle that encloses all the foreground elements of the document page." See, for example, Faisal Shafait, Geometric Layout Analysis of Scanned Documents, PhD thesis, Technical University of Kaiserslautern, 2008. A related function found in some OCR engines is the Dual Splitting function. This function recognizes the situation where the input image is composed of two pages, when two consecutive pages of a book are scanned.

One problem with current approaches is that a portion of a neighboring page may be considered as part of the current page. The approach of Shafait can lead to two pages of a book having very different smallest rectangles. For example, a page with a large amount of white space will have a smaller rectangle than one which does not. Recognition of some typographical elements, such as headers and footers, based on page location, can thus be difficult.

INCORPORATION BY REFERENCE

U.S. Patent Application Publication No. US-2012/0079370, published Mar. 29, 2012, entitled "SYSTEM AND METHOD FOR PAGE FRAME DETECTION," by Hervé Déjean;

U.S. Pat. No. 8,340,425, issued Dec. 25, 2012, entitled "OPTICAL CHARACTER RECOGNITION WITH TWO-PASS ZONING," by Hervé Déjean et al.;

"SEARCHING FOR COMPACT HIERARCHICAL STRUCTURES IN DNA BY MEANS OF THE SMALLEST GRAMMAR PROBLEM", by Matthias Gallé, dated Feb. 15, 2011, 143 pages, Université de Rennes 1;

U.S. patent application Ser. No. 13/288,109, filed, Nov. 3, 2011, by Herve Dejean, entitled "SIGNATURE MARK DETECTION";

U.S. patent application Ser. No. 13/530,141, filed Jun. 22, 2012, by Hervé Déjean, entitled "SYSTEM AND METHOD FOR IDENTIFYING REGULAR GEOMETRIC STRUCTURES IN DOCUMENT PAGES";

U.S. Patent Publication No. US 2011/0145701, published Jun. 16, 2011, by Déjean et al., entitled "METHOD AND APPARATUS FOR DETECTING PAGINATION CONSTRUCTS INCLUDING A HEADER AND A FOOTER IN LEGACY DOCUMENTS";

U.S. Patent Publication No. US 2012/0079370, published Mar. 29, 2012, by Déjean, entitled "SYSTEM AND METHOD FOR PAGE FRAME DETECTION";

U.S. Patent Publication No. US 2012/0317470, published Dec. 13, 2012, by Déjean, entitled "GENERATE-AND-TEST METHOD FOR COLUMN SEGMENTATION"; and U.S. Pat. No. 7,937,653, issued May 3, 2011, by Déjean et al., entitled "METHOD AND APPARATUS FOR DETECTING PAGINATION CONSTRUCTS INCLUDING A HEADER AND A FOOTER IN LEGACY DOCUMENTS", are incorporated herein by reference in their entirety.

BRIEF DESCRIPTION

In one embodiment of this disclosure, described is a computer implemented method of generating a page frame sequential hierarchical structure associated with a sequence of pages associated with a digital version of a document comprising: a) obtaining a sequence of pages representing the document; b) defining a set of page frame features associated with each page of the sequence of pages, each page frame feature defined by a feature value type; c) computing a set of feature values associated with the set of page frame features for each page of the sequence; d) generating a set of n-grams from the sequence of pages, an n-gram including an ordered sequence of n page frame features provided by a sequence of n pages; e) electing sequential n-grams from the set of n-grams, the sequential n-grams defined as similar contiguous n-grams; f) selecting the most frequent sequential n-gram from the elected sequential n-grams; and g) generating a new sequence of the pages by matching the selected most frequent sequential n-gram against the sequence of pages associated with the document, replacing matched pages of the sequence of pages with a respective node, and associating the matched pages of the sequence of pages as children of the respective node, the new sequence of pages representing the page frame hierarchical sequential structure associated with the document.

In another embodiment of this disclosure, described is an image processing system comprising: a controller configured to receive a digital version of a document, the controller configured to execute instructions to perform a method of generating a page frame hierarchical sequential structure associated with a digital version of the document comprising: a) obtaining a sequence of pages representing the document; b) defining a set of page frame features associated with each page of the sequence of pages, each page frame feature defined by a feature value type; c) computing a set of feature values associated with the set of page frame features for each page of the sequence; d) generating a set of n-grams from the sequence of pages, an n-gram including an ordered sequence of n page frame features provided by a sequence of n pages; e) electing sequential n-grams from the set of n-grams, the sequential n-grams defined as similar contiguous n-grams; f) selecting the most frequent sequential n-gram from the elected sequential n-grams; and g) generating a new sequence of the pages by matching the selected most frequent sequential n-gram against the sequence of pages associated with the document, replacing matched pages of the sequence of pages with a respective node, and associating the matched pages of the sequence of pages as children of the respective node, the new sequence of pages representing the page frame hierarchical sequential structure associated with the document.

In still another embodiment of this disclosure, described is a computer program product comprising a non-transitory recording medium storing instructions, which when executed on a computer cause the computer to perform a method of generating a page frame hierarchical sequential structure associated with a digital version of a document comprising: a) obtaining a sequence of pages representing the document; b) defining a set of page frame features associated with each page of the sequence of pages, each page frame feature defined by a feature value type; c) computing a set of feature values associated with the set of page frame features for each page of the sequence; d) generating a set of n-grams from the sequence of pages, an n-gram including an ordered sequence of n page frame features provided by a sequence of n page frames; e) electing sequential n-grams from the set of n-grams, the sequential n-grams defined as similar contiguous n-grams; f) selecting the most frequent sequential n-gram from the elected sequential n-grams; and g) generating a new sequence of the pages by matching the selected most frequent sequential n-gram against the sequence of pages associated with the document, replacing matched pages of the sequence of pages with a respective node, and associating the matched pages of the sequence of pages as children of the respective node, the new sequence of pages representing the page frame hierarchical sequential structure associated with the document.

DETAILED DESCRIPTION

Figure 1:
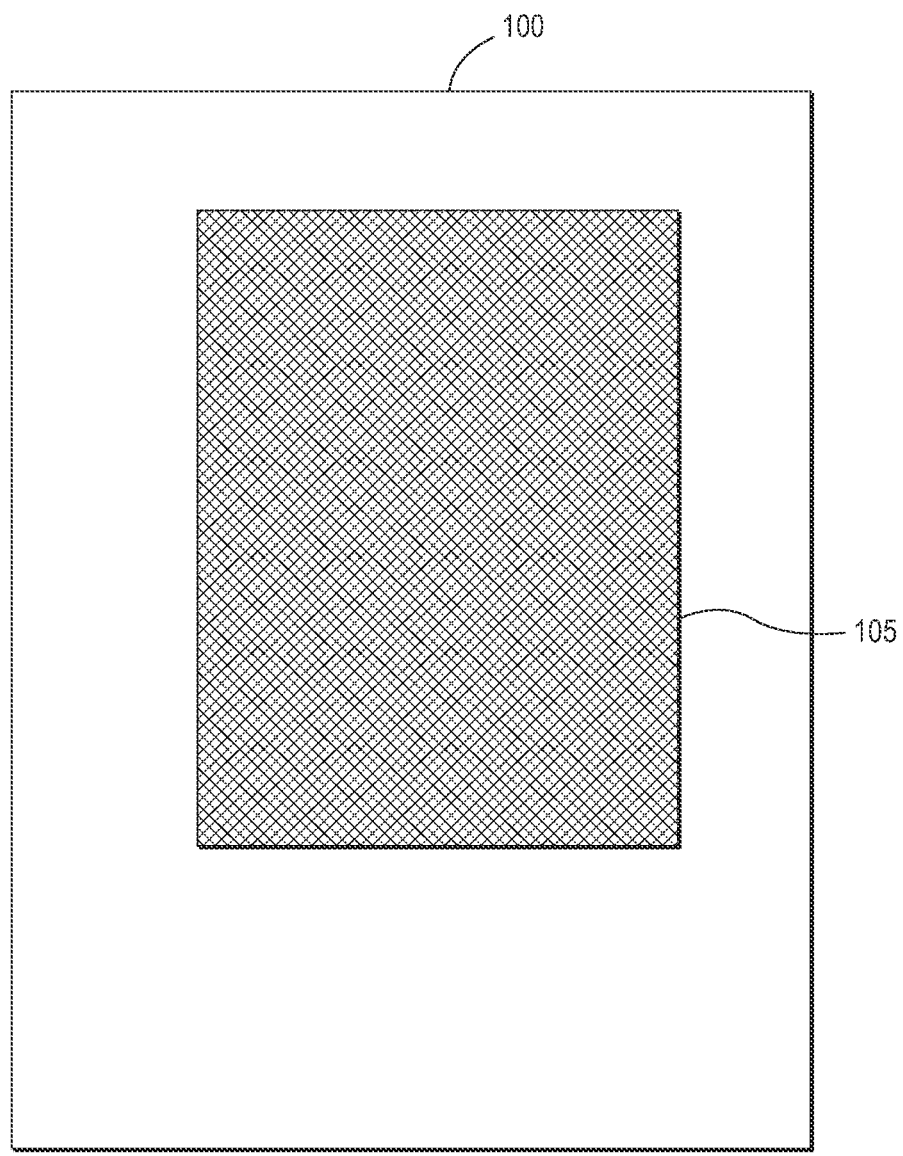
FIG. 1 is a view of a page and associated page frame.

This disclosure provides methods and systems of page frame inference associated with a layout oriented document. In general, the methods and systems provided apply algorithms based on document structures generated as disclosed in co-pending U.S. patent application Ser. No. 13/911,452, filed Jun. 6, 2013, entitled "METHODS AND SYSTEMS FOR GENERATION OF DOCUMENT STRUCTURES BASED ON SEQUENTIAL CONSTRAINTS", by Hervé Déjean. According to one exemplary embodiment, page frame inference is achieved by running a fuzzy structure induction process as disclosed in the Déjean '452 application on each page margin separately, thereby obtaining a set of prototypical margins, from which the process derives a set of page frame prototypes which are assigned to each page. Another run of the fuzzy structure induction process on the sequence of page frame prototypes identifies an overall page frame structure associated with the document. Finally, the prototypes obtained are used to infer optimal page coordinate systems.

A page frame is the area in which content is laid out. The identification of this zone in important for different tasks in document layout analysis. Provided here are methods and systems based on a generated sequential structure. For a document, the disclosed methods aim at discovering one or more page frames. According to one exemplary embodiment, each page frame is described with 6 features based on the content bounding box: height, width, left and right margin width, top and bottom margin height. The first step of the method is to identify potential values for the page frame characteristics using a sequence-based method. Then, based on these values, page frame objects are created. Finally, the sequence-based method is used to select the best page frames and associated them to their pages. Additionally, the most reliable coordinate system is associated to each page so as to position elements in it.

Some potential advantages of the disclosed methods and systems presented here are relative simplicity and richer information achieved with less source code.

By way of additional background, U.S. Patent Application Publication No. US-2012/0079370, published Mar. 29, 2012, entitled "SYSTEM AND METHOD FOR PAGE FRAME DETECTION," by Hervé Déjean provides a method to identify a set of recurrent page frames in a document, i.e. the regular page zones where content is laid out, and to associate each page of the document to one of the identified frames. In a first phase, the histograms of the dimensions of the page frames given by the bounding boxes and margins are computed. Then, looking at any combination of these dimensions which are consistent with the page dimensions, the most probable page frames are computed. Finally, for each page frame thus determined, the corresponding pages are computed using an approximate match algorithm.

As previously discussed, advantages of detecting a reliable page frame are numerous in document analysis, and not only limited to scanned documents. For example, 1. Noise removal for OCR;
2. Reliable element positioning, in terms of relative positioning of an element relative to the page frame. This is in comparison to positioning elements relative to a page; and
3. Improve and correct zoning, such as used in U.S. Pat. No. 8,340,425, issued Dec. 25, 2012, entitled "OPTICAL CHARACTER RECOGNITION WITH TWO-PASS ZONING," by Hervé Déjean et al., where the identification of some document objects, among them the page frame, is used to post correct zoning and OCR.

The advantage of using a sequence-based method, as discussed herein, is additional source code is relatively simple and relatively easy to maintain, transfer, and re-write. Compared to previous methods, the identification of page frame characteristics such as height, width, and margins is no longer based on frequency histograms. A matching step, which is relatively complex in previous methods, is much simpler here. In addition to page frame detection, provided herein is a method which determines the most reliable coordinate system associated with a page in order to position elements in the associated page, i.e. which axes used to define horizontal and vertical elements. This method is based on extracted information during the page frame detection process.

A "document" is used herein to mean an electronic (e.g., digital) or physical (e.g., paper) recording of information. In one exemplary embodiment, a hardcopy document, such as a book, is scanned to provide a set of scanned document pages, i.e. page scans, from the same document, each page scan comprising a bitmap. At least some of the bitmaps comprise arrangements of pixels that are recognizable by an OCR engine as text elements. A scanned document can thus be a collection of multiple page scans ("pages"). The document can be of any number of pages, such as up to 1000 pages or more. The method and system are particularly suited to scanned pages. However, it is also applicable to pages in a page description language such as PDF which are converted to another format where some noise is introduced in the conversion. For convenience, reference will be made throughout to scanned pages which have been processed to identify content, bearing in mind that other formats are also contemplated.

Each OCR-processed page scan can be considered to contain zero or more objects, the objects including text objects, such as page headers, footers, main text blocks, lines of text, etc., and/or non-text objects, such as graphical or photographic images. In addition to the page content, i.e. objects derived from the original hardcopy document page, the page scan may also include noise, such as textual and/or non-textual noise. The textual noise, and in some cases, the non-textual noise, may be recognized as objects of the page by the OCR engine.

For purposes of this disclosure, a "page frame" is defined as a rectangular page zone where the page content elements are laid out. The page frame is a complementary zone relative to the page margins. Together, the page frame and page margins encompass the entire page. To compute this rectangle, additional information other than the current processed page is employed. The page frame is computed considering all, or at least some, of the pages of the document. Since the page frame is identified on a multiple page basis for a document, rather than for each individual document page, the page frame assigned to a page scan may not exactly match the page content of that page. The page frame for a given page can thus include, within it, white space at one or more of the top, bottom, and sides of the current page content objects and can exclude some objects, which are ideally objects from a neighboring page. This is in contrast with the conventional definition of a page frame as being the smallest rectangle which encompasses the page content objects.

A "bounding box," as used herein, is the smallest rectangle that encloses all the detected objects of a page scan, i.e. a document image, and is computed for each page of the document. The detected objects, e.g., those detected through optical character recognition (OCR), can include text objects of a current page, but can also include detected images where the OCR processor detects images and can include textual noise detected on an adjacent page. As will be appreciated, for a given scanned document page, the bounding box may be smaller or larger than the assigned page frame.

Provided below is a description of an exemplary sequence-based method for detecting page frames in a set of pages associated with a document according to this disclosure.

Figure 2:
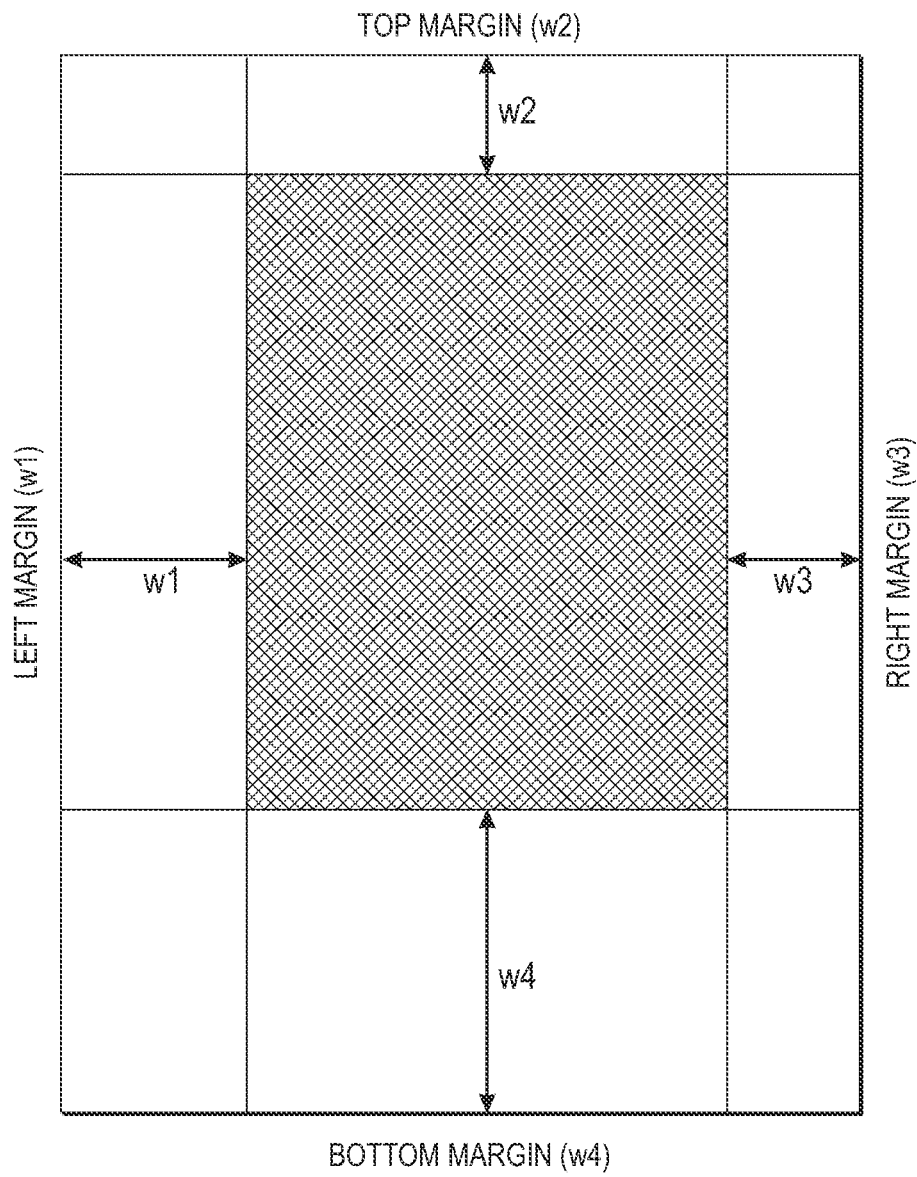
FIG. 2 is a complimentary view of the page frame shown in FIG. 1, along with the derived 4 page margins.

As discussed above and with reference to FIGS. 1 and 2, a page frame 105 is the zone of a page 100 where content is laid out. It is characterized by is height and width, as well as its position with the page 100. The position is computed from the width of the 4 margins associated with the page 100, i.e. top margin, bottom margin, left margin and right margin. A document may include several different page frames which indicate different structures in the document: matter, first page of section, and addenda for instance.

Figure 3:
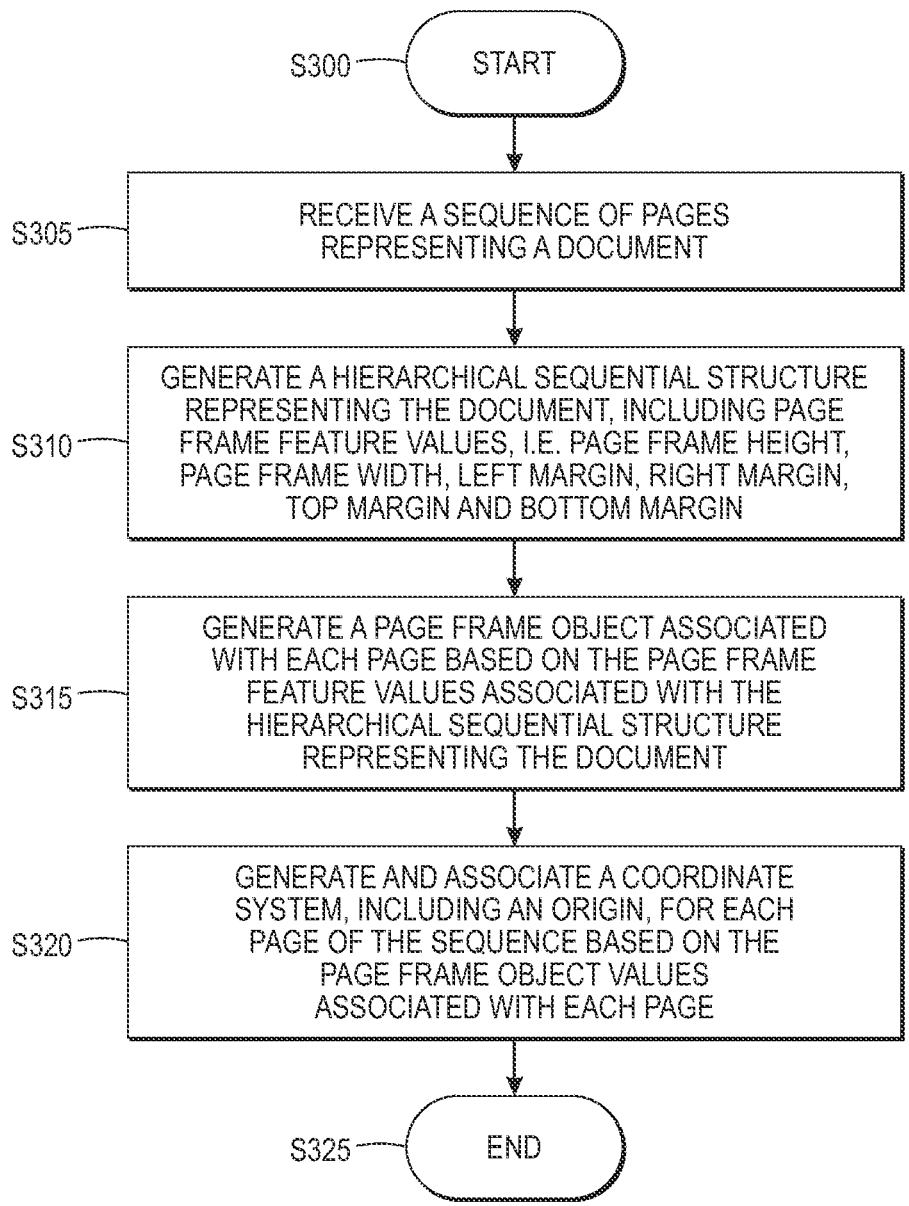
FIG. 3 is a flow chart of an exemplary method of generating a page frame hierarchical structure associated with a document.

With reference to FIG. 3, illustrated is a flow chart of an exemplary method of generating a page frame hierarchical structure associated with a document.

At S300, the process starts.

Then, at S305, the process receives a sequence of pages representing a document.

Next, step S310 generates a hierarchical sequential structure representing the document, including page frame feature values, i.e. page frame height, page frame width, left margin, right margin, top margin and bottom margin.

Next, step S315 generates a page frame object associated with each page based on the page frame feature values associated with the hierarchical sequential structure representing the document.

Next, step S320 generates and associates a coordinate system, including an origin, for each page of the sequence based on the page frame object values associated with each page.

Finally, at step S325, the process ends.

Provided below is a detailed description of generating a page frame sequential hierarchical structure associated with a sequence of pages associated with a digital version of a document.

Input Format.

As an input, the method takes a document considered as an ordered sequence of pages. A page contains the geometrical description of its textual and graphical objects: their position and their shape, e.g. rectangle. This kind of information is typically provided by OCR engines or page layout languages such as PDF.

Sequence-Based Method.

Provided here is a generic sequence-based method of generating a document. The method is further explained in U.S. patent application Ser. No. 13/911,452, filed Jun. 6, 2013, entitled "GENERATION OF DOCUMENT STRUCTURES BASED ON SEQUENTIAL CONSTRAINTS AND FUZZY MATCHING" by Hervé Déjean. The objective of the method is to structure a sequence of elements by identifying repetitive contiguous patterns The steps of the sequence-based method are as follows where an input is an ordered sequence of elements.

Step 1) Elements characterization: Elements are described with a set of features. In this step, the fuzzyequality of features is defined. The term fuzzyequal is used to characterize two features of the same type whose values difference is less than the maximal distance for this feature type.

Step 2) Features are calibrated: similar features are regrouped together which provides a kind of clustering.

Step 3) N-grams generation: a set of n-grams (from 1 to N, N being a parameter) is generated for the sequence of elements Step 4) Repetitive N-grams are selected and ordered by frequency Step 5) The most frequent n-gram is selected and sequences of elements matching this n-gram are structured by associating the matched elements with a common node.

Step 6) The identified sequences are enriched with additional n-grams.

Step 7) The method is applied iteratively to the current sequence of elements.

In the following description, the above steps are referenced with a [STEP X] indication starting a paragraph, if the paragraph corresponds to the method step described above.

Sequence-Based Method for Identifying Page Frame.

Based on a sequence-based method, frames are identified in a document.

Notably, the sequence-based method is used here twice:

A first time to identify page frame key features values and then page frame models, i.e. objects, are computed and considered as new features for the pages. A second sequence-based method is applied with these new features and selected key page frame models which are associated to their pages.

[STEP 1] The order elements of the method are the pages of a document. The set of features for each page is:
1. bounding box height;
2. bounding box width;
3. bounding box x-start, (left margin);
4. bounding box x-end, (right margin);
5. bounding box y-start, (top margin); and
6. bounding box y-end. (bottom margin).

The bounding box corresponds to a rectangle containing the considered content elements of the page. For the sake of simplicity, only one bounding box is computed with textual elements according to this description, however, several bounding boxes can be computed. For example, taking into account or not images, graphical lines, 1-letter textual elements, etc.

The features used are simply numerical features (floating value), the fuzzyequality is based on a threshold: two values are equal if their difference is lesser than a given threshold.

Then, 6 sequences are built using each feature independently for a given page, where one single feature is considered at a time and each sequence captures regularities for a given page frame feature.

Figure 4:
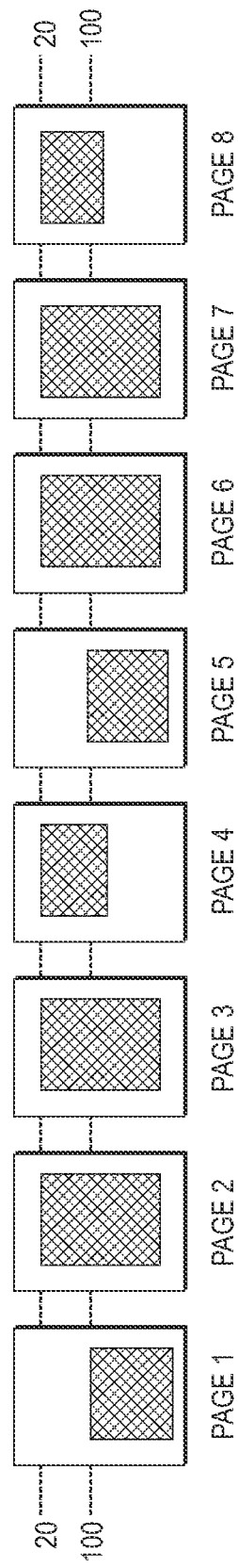
FIG. 4 illustrates an example of a set of pages and their associated page frame top margin feature.

FIG. 4 shows pages, and their set of features for the top margin. According to the example illustrated, possible values for the top-margin feature are 20 and 100 which represent the vertical position of the bounding box in the page.

[STEP 3] The n-grams generated by the sequence-based method for the top-margin feature are:

[top-margin=20] (repetitive);

[top-margin=100] (non-repetitive);

[top-margin=100][top-margin=20] (non repetitive);

[top-margin=100][top-margin=20][top-margin=20] (non repetitive);

. . . .

[STEPS 4 and 5] A first repetitive sequence of pages with the feature [top-margin=20] is grouped. Applying n-gram generation to this sequence generates the following n-grams:

[top-margin=100][top-margin=20]+(repetitive);

[top-margin=100] (non-repetitive);

[top-margin=20]+[top-margin=100] (non-repetitive);

. . . .

[STEP 6] No enrichment is performed for this application.

Figure 5:
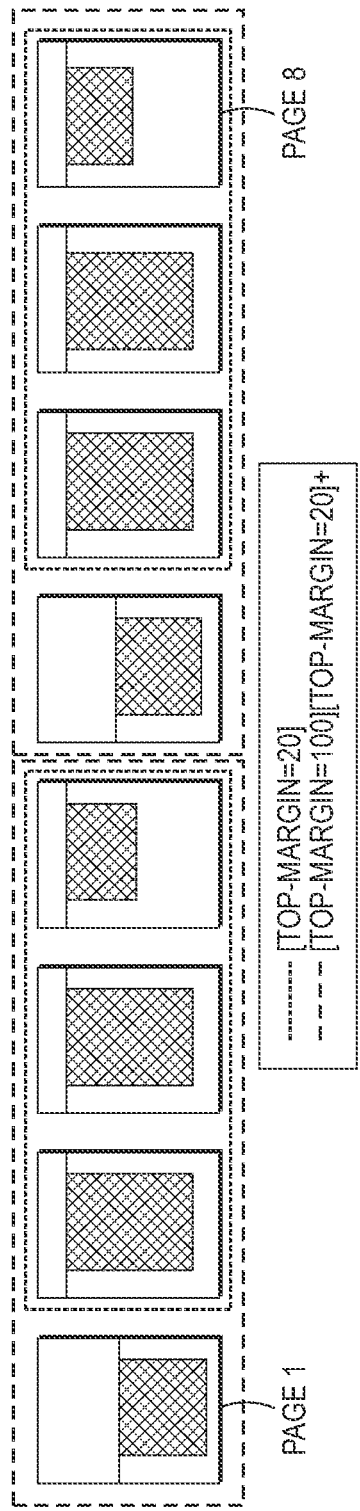
FIG. 5 illustrates an example of a final structure generated for the set of pages shown in FIG. 4, according to an exemplary embodiment of this disclosure.

[STEP 7] A second repetitive n-gram, a bi-gram structure; [top-margin=100][top-margin=20]+ is identified. Applying the sequence-based method generates the final structured sequence shown in FIG. 5.

All pages are associated with a top-margin value. The sequence-based method is applied over the sequence of pages for the remaining 5 features. The output sequences identify key values for each feature type. Each page is decorated with the set of 6 selected key values, which may be an incomplete set.

Figure 6:
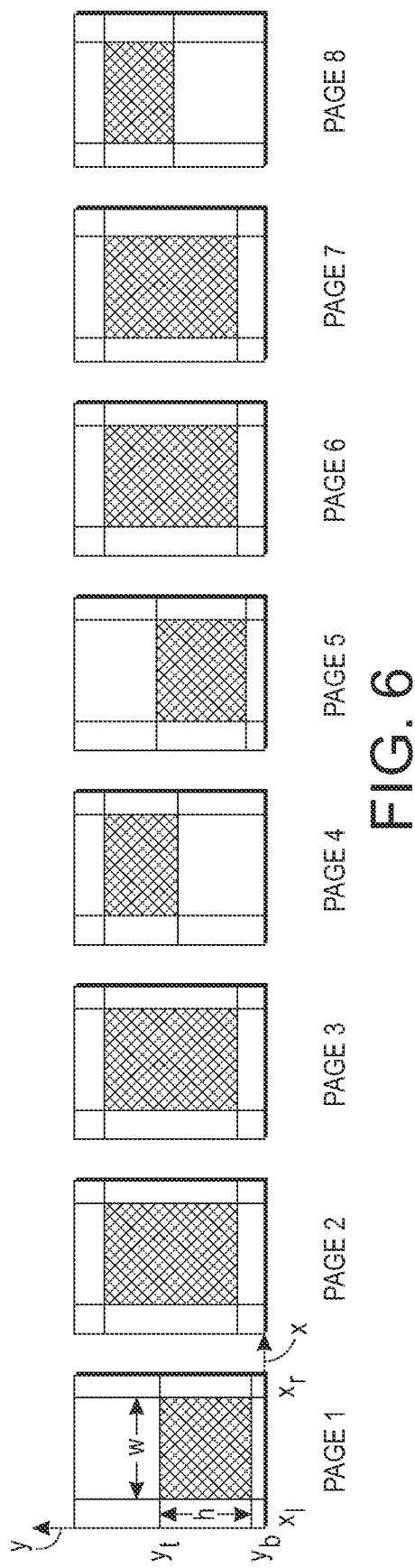
FIG. 6 illustrates an example of the set of pages shown in FIG. 4, along with their associated page frame features, i.e. page frame width, left margin, right margin, page frame height, top margin and bottom margin.

FIG. 6 is the output of the first main step described above and shows pages with their associated values for the 6 features.

Pages are associated with, at most, 6 features values corresponding to the page frames characteristics. Some pages, e.g. pages 4 and 8, have no bottom-margin where no regular values were identified for these pages.

Initially, page frame candidates are built using the output of the previous step. For all pages a page frame object is created. A page frame is simply defined with the 6 following fields: width, left margin, right margin, height, top margin, bottom margin. If a field is not given by the previous step, the field is marked as unknown.

Figure 7:
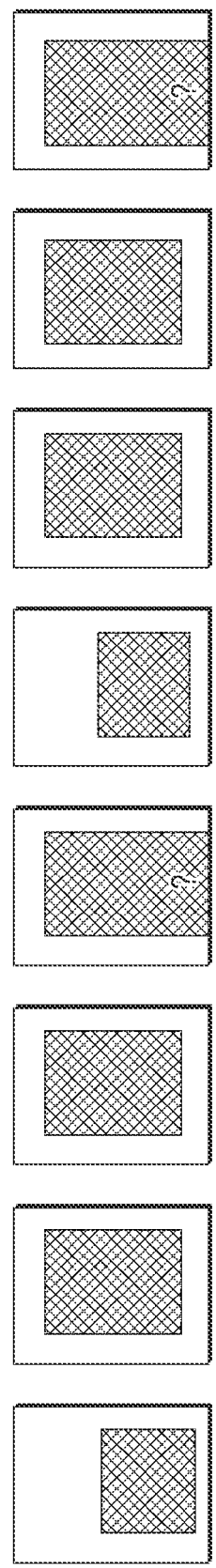
FIG. 7 illustrates an example of generated page frame objects corresponding to the pages shown in FIG. 6, according to an exemplary embodiment of this disclosure.

FIG. 7 shows generated page frame objects for each page. For pages 4 and 8, no regular bottom margin was found.

Now, the sequence-based method is again applied over the page sequence, considering this time the completed page frames as features of the pages to define the fuzzy-equal function for comparing two page frame objects. Here, some domain knowledge is provided in the fuzzy-equal function:

instead of using a traditional overlap between two zones, two page frame objects are considered as equal if they have at least one common corner, i.e. two common borders. This constraint provides a good trade-off in accepting some variations of pages frames generated from incomplete pages.

Table 1 below shows the list of page frame feature for the set of pages of the example provided:

TABLE 1

| page | Page frame feature |
|---|---|
| 1 | [200, 30, 30, 150, 150, 10] |
| 2 | [200, 30, 30, 250, 30, 10] |
| 3 | [200, 30, 30, 250, 30, 10] |
| 4 | [200, 30, 30, none, 30, none] |
| 5 | [200, 30, 30, 150, 150, 10] |
| 6 | [200, 30, 30, 250, 30, 10] |

TABLE 1-continued

| page | Page frame feature |
|---|---|
| 7 | [200, 30, 30, 250, 30, 10] |
| 8 | [200, 30, 30, none, 30, none] |

Next, the generated n-grams are:

[200,30,30,250,30,10] (repetitive);

[200,30,30,150,150,10] (non-repetitive);

[200,30,30,none,30,none] (non-repetitive);

[200,30,30,150,150,10]; [200,30,30,250,30,10] (non-repetitive);

. . . .

Then, the most frequent repetitive n-gram is selected: [200, 30,30,250,30,10].

Next, the sequence is structured, and using the defined fuzzy-matching function, the resulting structure is built:

TABLE 2

| Page | Feature | Matched sequence |
|---|---|---|
| 1 | [200, 30, 30, 150, 150, 10] | |
| 2 | [200, 30, 30, 250, 30, 10] | [[200, 30, 30, 250, 30, 10] |
| 3 | [200, 30, 30, 250, 30, 10] | [200, 30, 30, 250, 30, 10] |
| 4 | [200, 30, 30, 250, 30, 10] | [200, 30, 30, 250, 30, 10]] |
| 5 | [200, 30, 30, 150, 150, 10] | |
| 6 | [200, 30, 30, 250, 30, 10] | [[200, 30, 30, 250, 30, 10] |
| 7 | [200, 30, 30, 250, 30, 10] | [200, 30, 30, 250, 30, 10] |
| 8 | [200, 30, 30, none, 30, 10] | [200, 30, 30, 250, 30, 10]] |

Pages 4 and 8 are considered as matching the selected n-gram (common corner). Pages 1 and 5 have no common corner with the selected page frame.

The new sequence is shown in Table 3 below.

TABLE 3

| Sequence (N: new node) | Feature |
|---|---|
| 1 | [200, 30, 30, 150, 150, 10] |
| N1 | [200, 30, 30, 250, 30, 10]+ |
| 5 | [200, 30, 30, 150, 150, 10] |
| N2 | [200, 30, 30, 250, 30, 10]+ |

Next, no enrichment is done for this application.

Iteratively, a new n-gram is selected. This time the selected repetitive n-gram is:

{[200,30,30,150,150,10]; [200,30,30,250,30,10]+}.

The final structure is:

TABLE 4

| toplevel | Level 1 | Level 2 | Level 3 | Level 4 |
|---|---|---|---|---|
| ([200, 30, 30, 150, 150, 10]; [200, 30, 30, 250, 30, 10]+; | | | | |
| | [200, 30, 30, 150, 150, 10]; [200, 30, 30, 250, 30, 10]+ | [200, 30, 30, 150, 150, 10] | 1 | |
| | | [200, 30, 30, 250, 30, 10]+ | [200, 30, 30, 250, 30, 10] | 2 |
| | | | [200, 30, 30, 250, 30, 10] | 3 |
| | | | [200, 30, 30, 250, 30, 10] | 4 |
| | | [200, 30, 30, 150, 150, 10] | 5 | |
| | | [200, 30, 30, 250, 30, 10]+ | [200, 30, 30, 250, 30, 10] | 6 |
| | | | [200, 30, 30, 250, 30, 10] | 7 |
| | | | [200, 30, 30, 250, 30, 10] | 8 |

Figure 8:
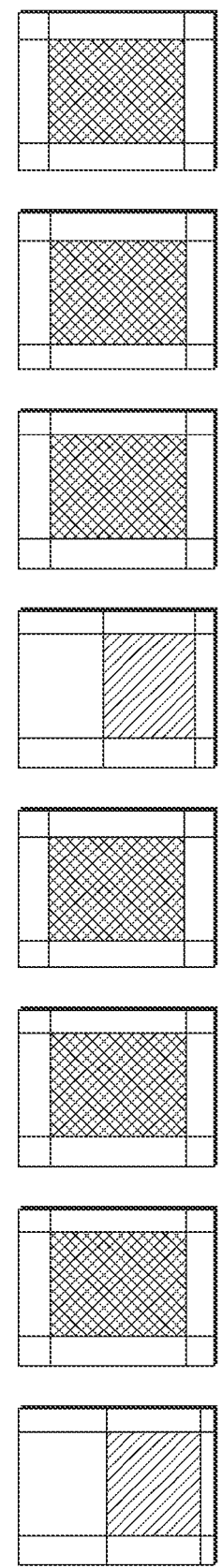
FIG. 8 illustrates a final sequence of pages and their associated page frame features based on the generated page frame objects shown in FIG. 7.

Notably, if the page frames associated with pages 1 and 5 had a common corner, such as the left or right bottom corners in the example, the final sequence would have had one single page frame. (See FIG. 8)

Page Frame Information and Coordinate System.

Described here is the final information associated to a page. Through the complete or partial page frame information obtained, the most reliable coordinate system is computed for positioning elements inside the page. Basic positioning is absolute: from the top left corner of the page. For different reasons (scanned pages, mirrored pages, . . . ), it is very useful to consider the coordinate system relatively to the page frame. Shown and described here is that partial page frame information is often enough to build a coordinate system.

The set of information associated to a page reflects the regularities found in the document.

Initially, the full page frame information, i.e. height, width, and 4 margins width resulting from the generation of page frame objects is extracted and a coordinate system is then defined by using the left margin as an origin of the horizontal axis and the top margin as an origin of the horizontal axis. The origin point (0, 0) is the intersection point of these two margins.

Figure 9:
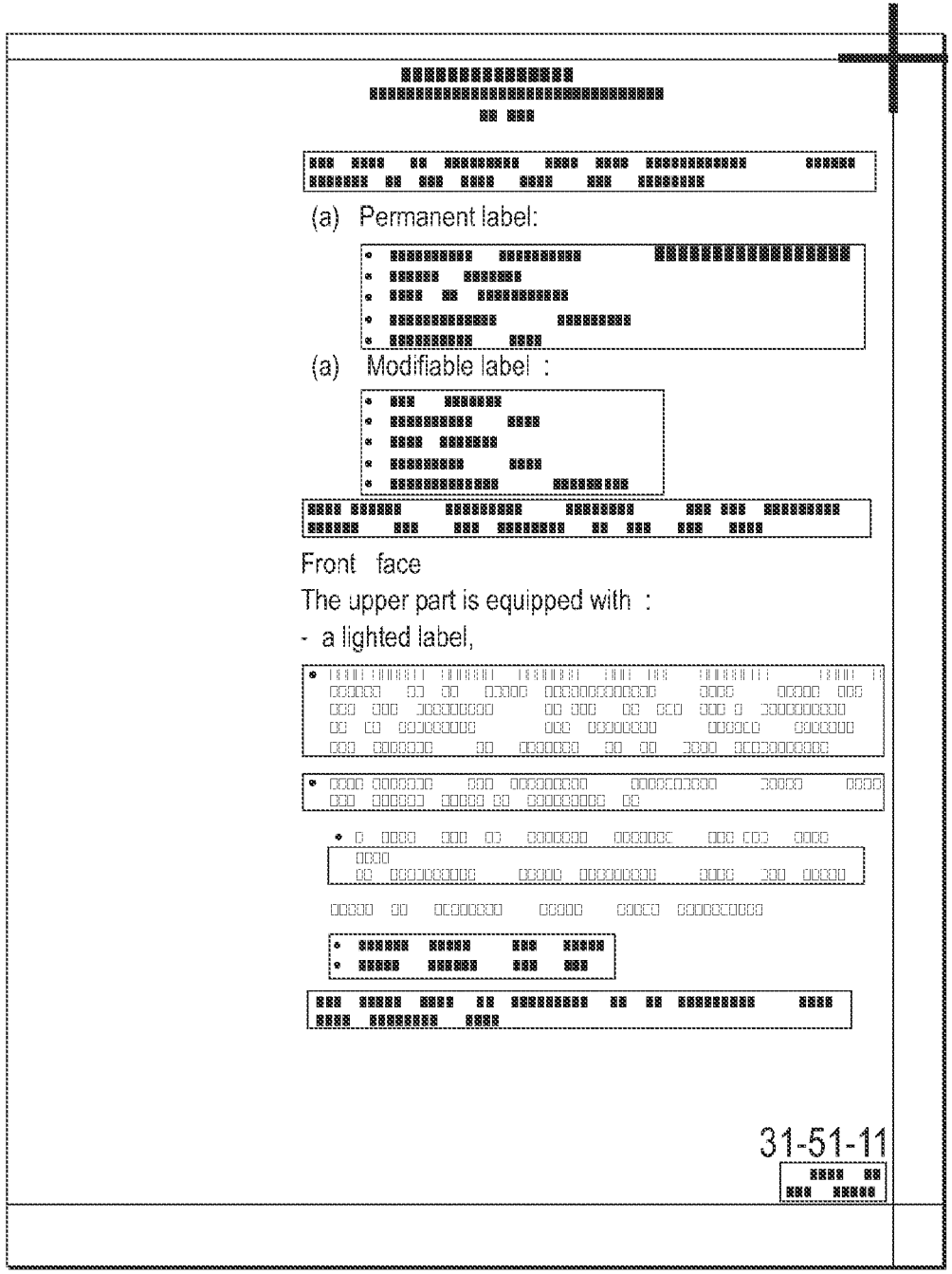
FIG. 9 illustrates an example of a coordinate system and associated origin for a page according to an exemplary embodiment of this disclosure.

Then, any partial page frame feature information associated with a page (between 1 and 4 features values) is used to reliably position elements in the page. A typical case for which the method is only able to generate partial information is for scanned bound books, especially when the book contains several hundreds of pages. In such cases it is often easy to find the size of the page frame, but not possible to position it inside the page. Another example is shown in FIG. 9, where it was not possible to find a regular value for the left margin due to a highly indented content. However, positioning elements in a page only requires one regular horizontal axis and a regular vertical axis.

In FIG. 9, the left margin was not regular enough in the document. The content is laid out through indented list items, i.e. four levels of indentation. The element position is then done with the top right corner. Alternatively, the top bottom could be used.

The method for selecting reliable axes is as follows:

Initially, if the page has at least one vertical margin (left, right), this margin is used as vertical axis. If a page has two vertical margins, the left margin is taken as the axis.

Then, similarly for horizontal margins (top and bottom)

Next, the intersection of both vertical and horizontal coordinate axes is taken as the origin.

Finally, if the page does not have at least one vertical and one horizontal margin, but the page frame height and width were found, the content bounding box is considered as the page frame, and the top left corner is used as the origin.

Hence, in FIG. 9, the top and right margins are then used as axes to position the elements. The top right corner is taken as the origin and the coordinates (x,y) of any elements are computed from this origin point.

More Elaborated Examples

Figure 10:
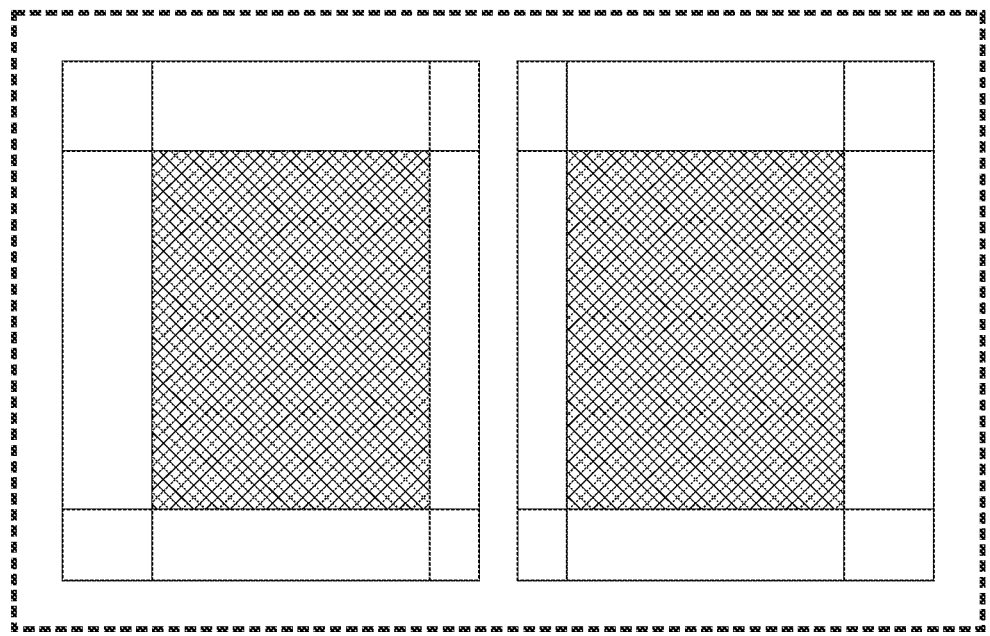
FIG. 10 illustrates an example of a document including mirrored pages.

A common case in typography is to use mirrored pages as shown in FIG. 10. The page frame for odd and even pages has the same size, but not the same position: internal margins are smaller than external margin. In such a case, the sequence-based method described herein first detects a bigram as the first repetitive n-gram (the odd-even page pair).

Appendices can have different page frames; in this case, different sequences are created. The document front matter, such as title page, copyright page, . . . , is often not covered by the method: they do not have enough sequence regularities where each of these pages has its own page frame.

Provided below, with reference to FIGS. 11-15, are descriptions of exemplary embodiments of methods of generating page frame structure attributes associated with a document, according to various exemplary embodiments of this disclosure.

Figure 11:
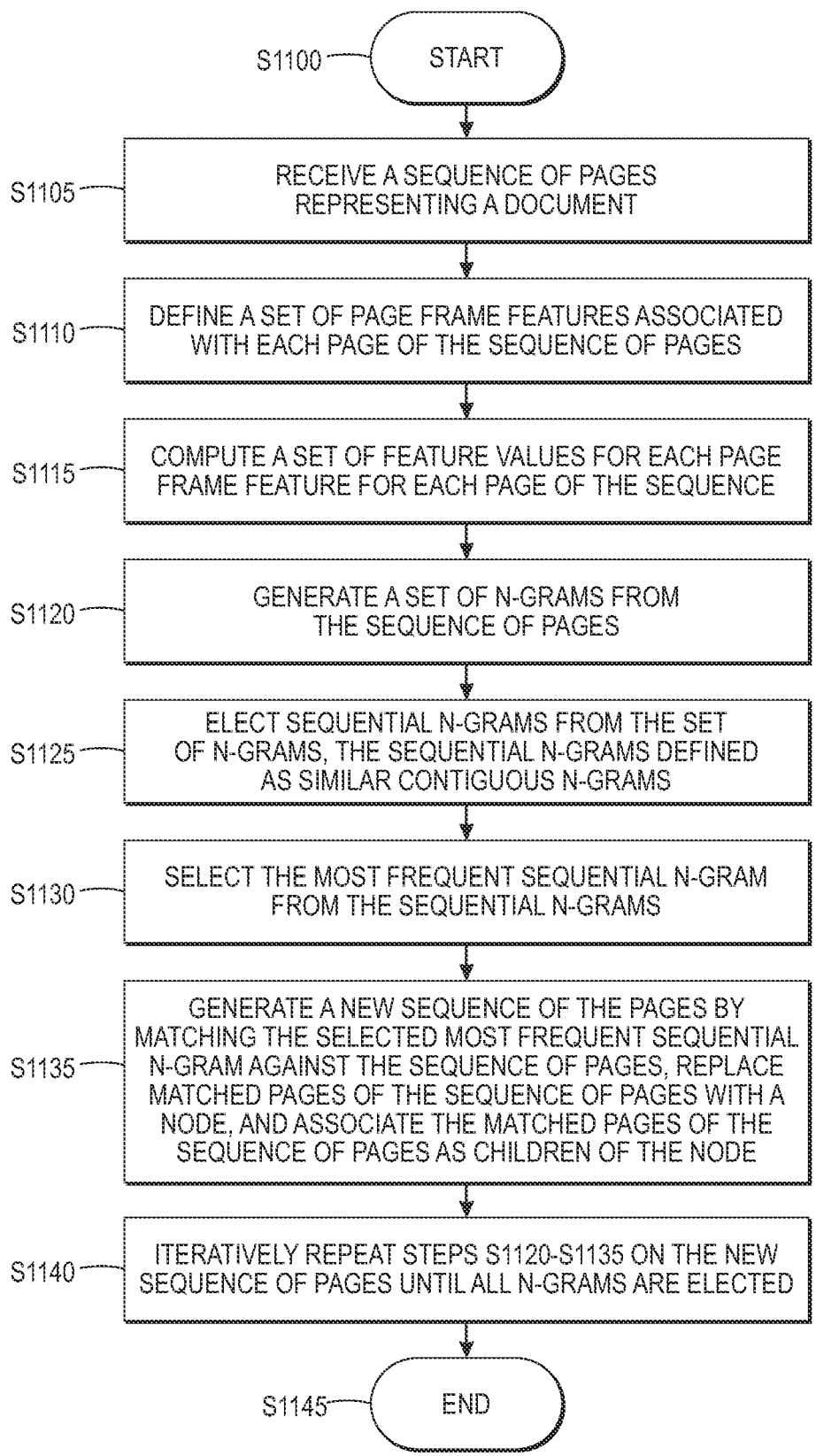
FIG. 11 is a flow chart of an exemplary method of generating page frame feature values associated with respective pages of a document, according to an exemplary embodiment of this disclosure.

With reference to FIG. 11, illustrated is a flow chart of an exemplary method of generating page frame feature values associated with respective pages of a document, according to an exemplary embodiment of this disclosure.

At S1100, the process starts.

Then, at step S1105, the process receives a sequence of pages representing a document.

Next, step S1110 defines a set of page frame features associated with each page of the sequence of pages.

Next, step S1115 computes a set of feature values for each page frame feature for each page of the sequence.

Next, step S1120 generates a set of n-grams from the sequence of pages.

Next, step S1125 elects sequential n-grams from the set of n-grams, the sequential n-grams defined as similar contiguous n-grams.

Next, step S1130 selects the most frequent sequential n-gram from the sequential n-grams.

Next, step S1135 generates a new sequence of the pages by matching the selected most frequent sequential n-gram against the sequence of pages, replace matched pages of the sequence of pages with a node, and associate the matched pages of the sequence of pages as children of the node.

Next, at step S1140, the process iteratively repeats steps S1120-S1135 on the new sequence of pages until all n-grams are elected.

Finally, at step S1145 the process ends.

Figure 12:
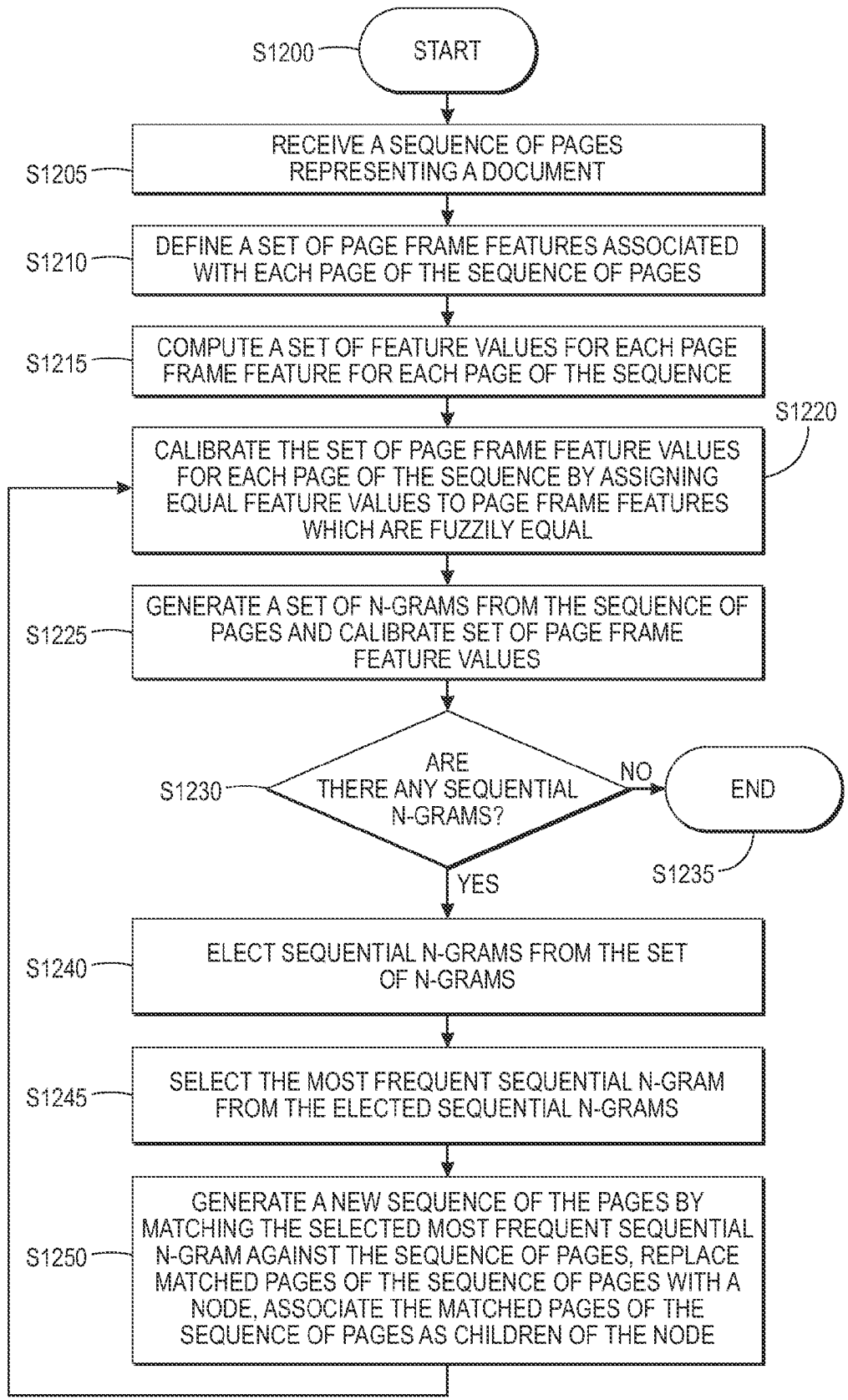
FIG. 12 is a flow chart of an exemplary method segmenting a sequence of pages associated with a document, the method including a calibration step which assigns equal feature values to page frame features which are fuzzily equal.

With reference to FIG. 12, illustrated is a flow chart of another method of segmenting a sequence of elements associated with a document, the method including a calibration step which assigns equal feature values to page frame features which are fuzzily equal.

At step S1200, the process starts.

Then, at step S1205, the process receives a sequence of elements representing a document.

Next, at step S1210, the process defines a set of named features associated with each element of the sequence of elements.

Next, at step S1215, the process computes a set of feature values for each named feature for each element of the sequence.

Next, at step S1220, the process calibrates the set of named feature values for each element of the sequence by assigning equal feature values to named features which are fuzzily equal.

Next, at step S1225, the process generates a set of n-grams from the sequence of elements and calibrates a set of named feature values.

Next, at step S1230, the process determines if there are any sequential n-grams. If there are sequential n-grams, the process continues to step S12120, otherwise, the process ends at step S1235.

At step S1240, the process elects sequential n-grams from the set of n-grams.

Next, at step S1245, the process selects the most frequent sequential n-gram from the elected sequential n-grams.

Next, at step S1250, the process generates a new sequence of the elements by matching the selected most frequent sequential n-gram against the sequence of elements, replaces matched elements of the sequence of elements with a node, and associates the matched elements of the sequence of elements as children of the node and returns to step S1220.

Figure 13:
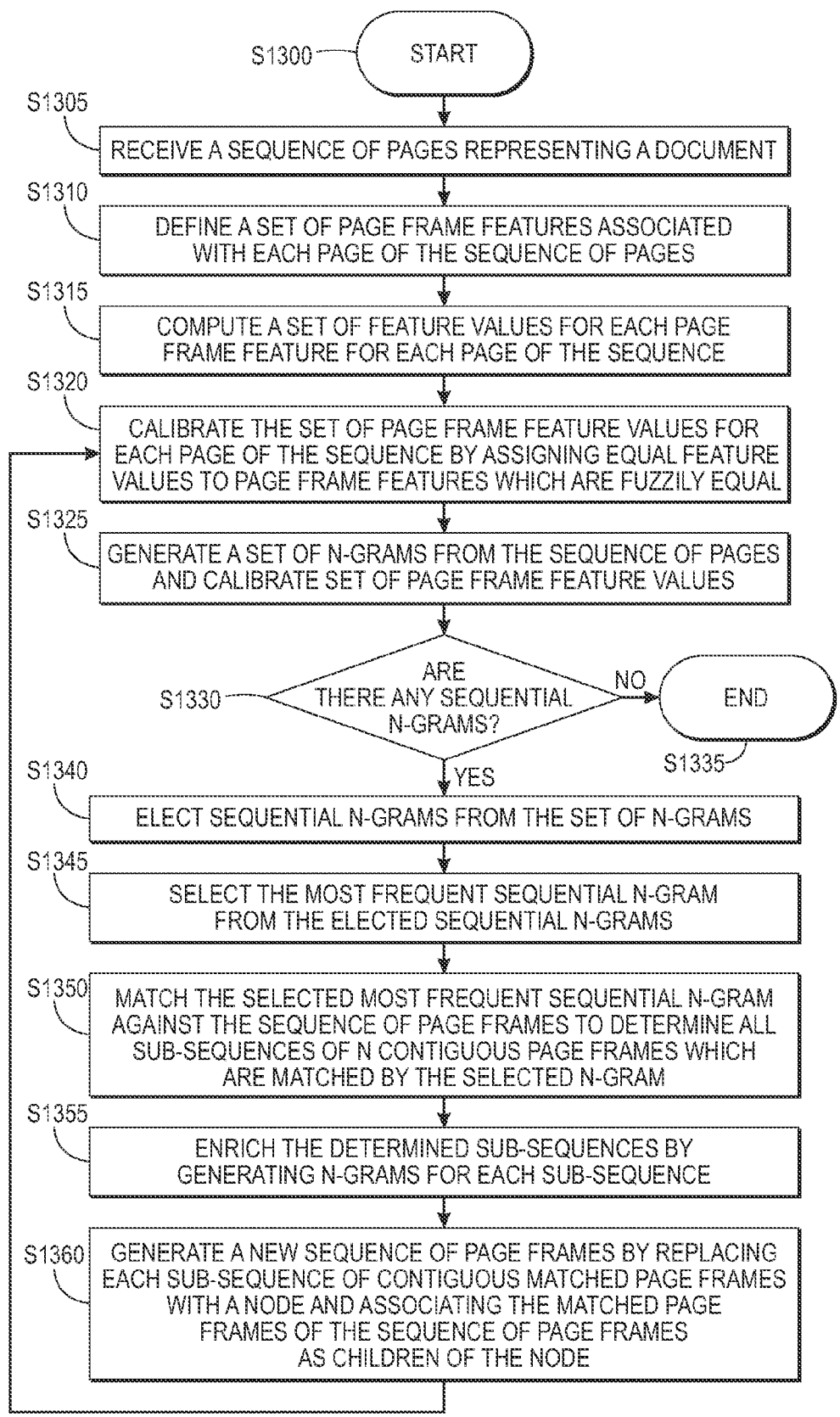
FIG. 13 is a flow chart of an exemplary method of segmenting a sequence of pages associated with a document, the method including a calibration step which assigns equal feature values to page frame features which are fuzzily equal and an enrichment step which includes the generation of n-grams for one or more sub-sequences of page frames.

With reference to FIG. 13, illustrated is a flow chart of another method of segmenting a sequence of elements associated with a document, the method including a calibration step and enrichment, as previously described.

At step S1300, the process starts.

Then, at step S1305, the process receives a sequence of pages representing a document.

Next, at step S1310, the process defines a set of page frame features associated with each element of the sequence of pages.

Next, at step S1315, the process computes a set of feature values for each page frame feature for each page of the sequence.

Next, at step S1320, the process calibrates the set of page frame feature values for each page of the sequence by assigning equal feature values to page frame features which are fuzzily equal.

Next, at step S1325, the process generates a set of n-grams from the sequence of pages and calibrates a set of page frame feature values.

Next, at step S1330, the process determines if there are any sequential n-grams. If there are sequential n-grams, the process continues to step S1320, otherwise, the process ends at step S1335.

At step S1340, the process elects sequential n-grams from the set of n-grams.

Next, at step S1345, the process selects the most frequent sequential n-gram from the elected sequential n-grams.

Next, at step S1350, the process matches the selected most frequent sequential n-gram against the sequence of page frames to determine all sub-sequences of n contiguous page frames which are matched by the selected n-gram.

Next, at step S1355, the process enriches the determined sub-sequences by generating n-grams for each sub-sequence.

Next, at step S1360, the process generates a new sequence of page frames by replacing each sub-sequence of contiguous matched page frames with a node and associating the matched page frames of the sequence of page frames as children of the node and returns to step S1320.

Figure 14:
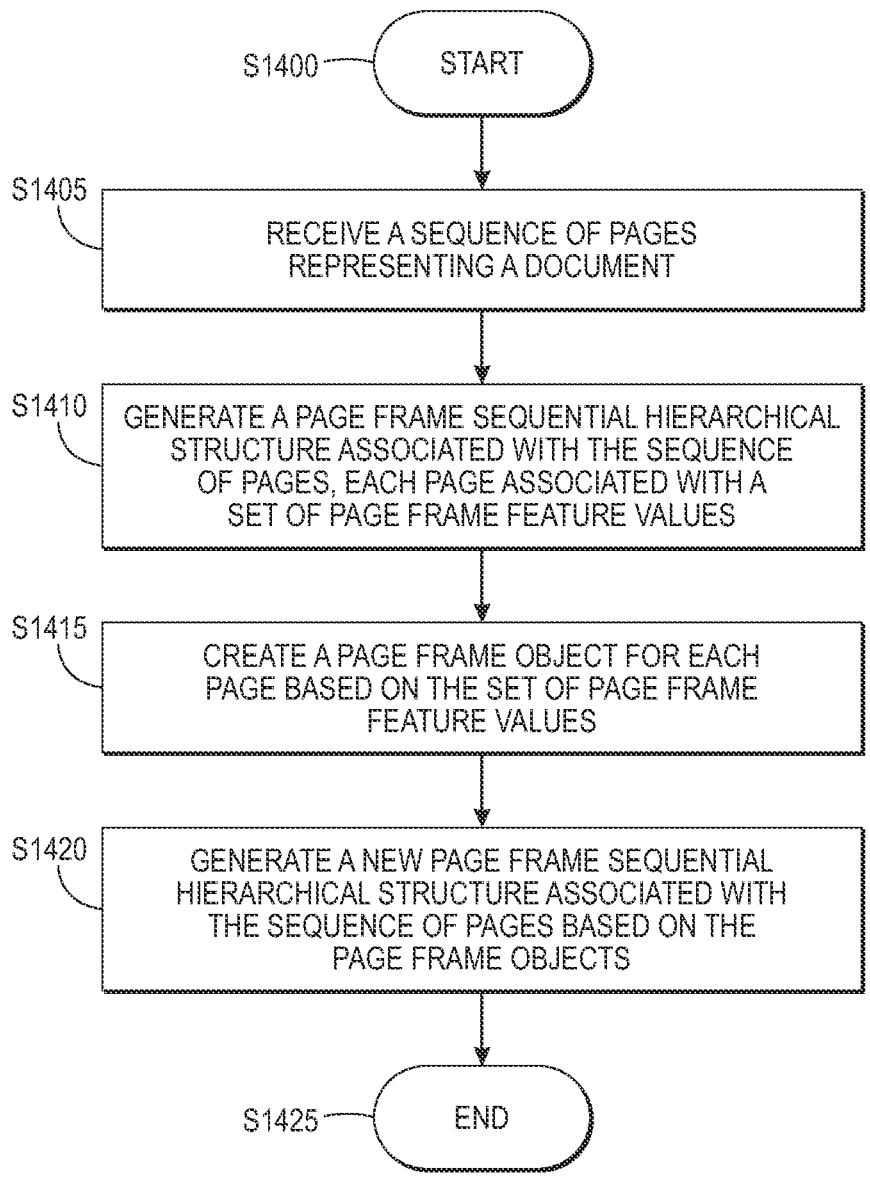
FIG. 14 is a flow chart of an exemplary method of generating page frame objects according to this disclosure.

With reference to FIG. 14, illustrated is a flow chart of an exemplary method of generating page frame objects according to this disclosure.

At step S1400, the process starts.

Then, at step S1405 the process receives a sequence of pages representing a document.

Next, step S1410 generates a page frame sequential hierarchical structure associated with the sequence of pages, each page associated with a set of page frame feature values.

Next, step S1415 creates a page frame object for each page based on the set of page frame feature values.

Next, step 1420 generates a new page frame sequential hierarchical structure associated with the sequence of pages based on the page frame objects.

Finally, at step S1425 the process ends.

Figure 15:
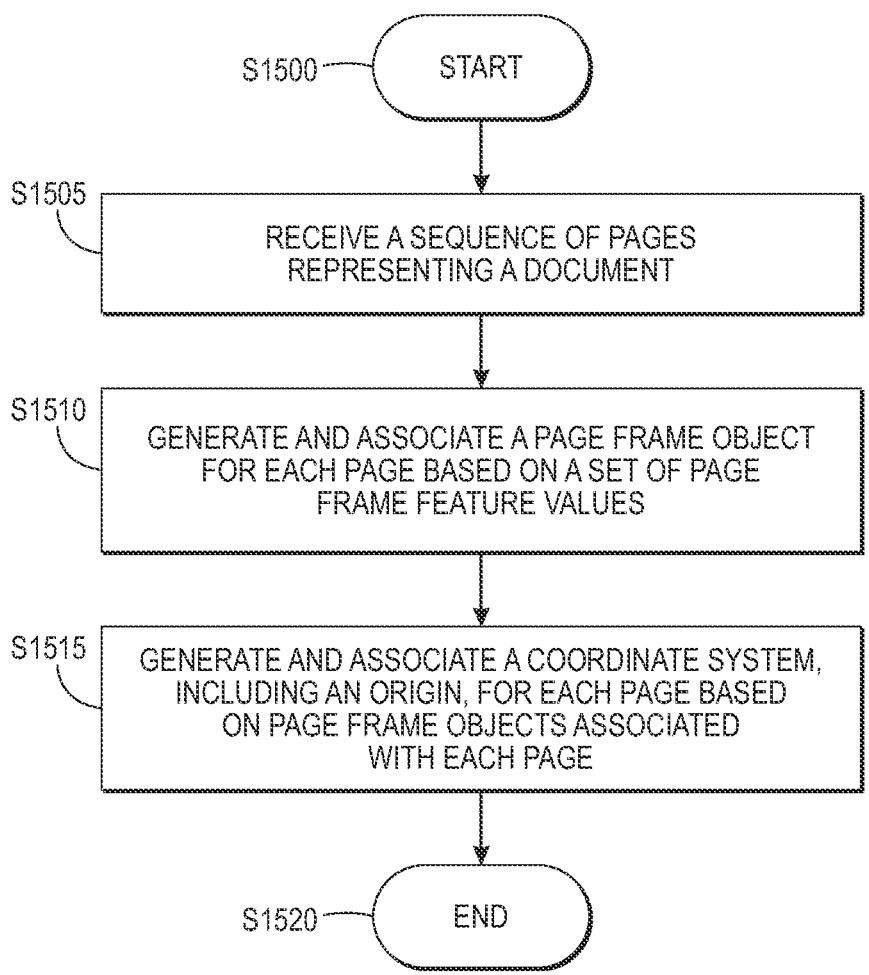
FIG. 15 is a flow chart of an exemplary method of generating and associating a coordinate system for each page associated with a document.

With reference to FIG. 15, illustrated is a flow chart of an exemplary method of generating and associating a coordinate system for each page associated with a document.

At step S1500, the process starts.

Then, at step S1505 the process receives a sequence of pages representing a document.

Next, step S1510 generates and associates a page frame object for each page based on a set of page frame feature values.

Next, step S1515 generates and associates a coordinate system, including an origin, for each page based on page frame objects associated with each page.

Finally, at step S1520 the process ends.

Figure 16:
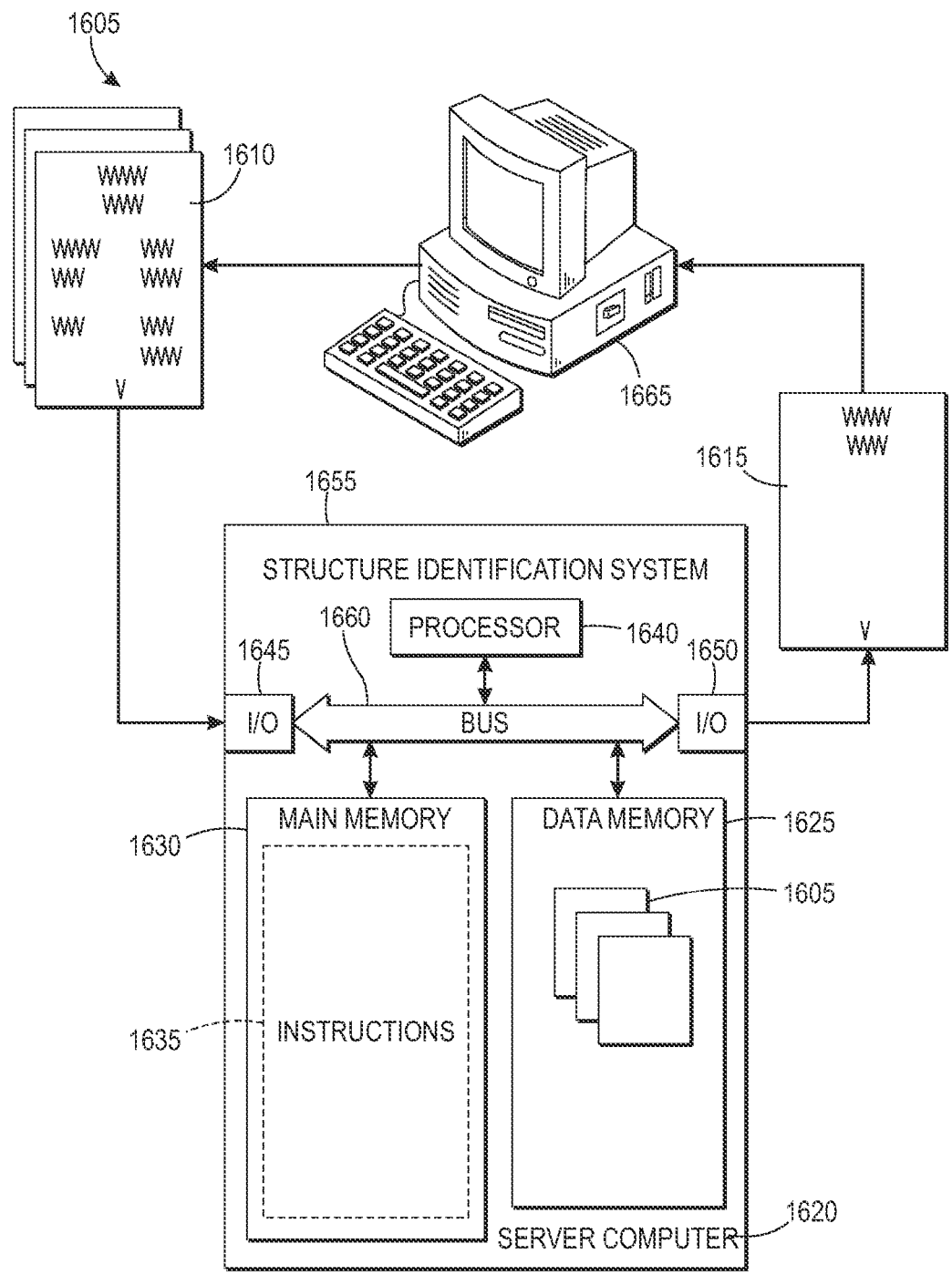
FIG. 16 is a functional block diagram of a document processing system which generates a page frame hierarchical structure associated with a document according to an exemplary embodiment of this disclosure.

With reference to FIG. 16, illustrated is an exemplary apparatus for generating a document structure associated with a document which may be used for performing the methods previously described. The system takes as input an unstructured document 1605 which includes one or more document pages 1610. The system outputs information 1615 describing the structure(s) which have been identified on the page, the page including a sequence of elements.

The exemplary system may include one or more specific or general purpose computing devices 1620. The system receives, as input, an unstructured document 1610 and stores the document in data memory 1625 during processing. The document is received in electronic form and can be a technical manual, book, journal publication, report, plan, or the like. The exemplary document is in a page description language, such as a PDF, Portable Document Format (Adobe Systems) file, although other unstructured documents are also contemplated, such as PostScript (Adobe Systems), PCL, Printer Command Language (Hewlett-Packard), such as PCL-5, PCL-5E, PCL-6, PCL-XL, TIFF, BMP, Word document, or the like. In PDF, for example, each page of a document is assigned a set of elements, such as text elements and graphical elements, and their respective sizes and locations are identified in a job ticket. The exemplary document includes one or more pages, each of which may be processed independently by the system. The page(s) may each include text, images, or combinations thereof. Images can be photographs, graphics, etc.

Main memory 1630 of the apparatus 1655 stores instructions 1635 for performing the exemplary method. These instructions 1635 are implemented by an associated processor 1640, such as the computer's CPU. The computer communicates with external devices via one or more input/output devices 1645, 1650. The hardware components 1625, 1630, 1640, 1645, 1650 are communicatively linked by a data/control bus 1660.

While a collection of documents could be processed, rather than a single document, the exemplary method is also suited to processing documents singly. Prior to inputting, the document pages may be stored in any suitable tangible storage media such as a disk, ROM or RAM, or may be input into the system in the form of a carrier wave, e.g., via the Internet. The input device may include a modem link, a wired or wireless connection, USB port, floppy or hard disk receiver, or the like and may be separated or combined with other components of the system. While the illustrated source of the document is a client computing device 1665 (which may be similarly configured to computer 1655, except as noted), it will be appreciated, that the document may be input from a scanner, or other digital image capture device, with an associated Optical Character Recognition (OCR) engine for processing the output of the scanner to generate the pages of document, or from a disk, flash drive or other memory storage device.

The system may comprise one or more computing devices such as a personal computer, PDA, laptop computer, server computer, or combination thereof. Memories 1625, 1630 may be integral or separate and may represent any type of non-transitory computer readable medium such as random access memory (RAM), read only memory (ROM), magnetic disk or tape, optical disk, flash memory, or holographic memory. In one embodiment, the memories comprise a combination of random access memory and read only memory. In some embodiments, the processor and memory may be combined in a single chip.

The digital processor 1640 can be variously embodied, such as by a single core processor, a dual core processor (or more generally by a multiple core processor), a digital processor and cooperating math coprocessor, a digital controller, or the like. The digital processor, in addition to controlling the operation of the computer, executes instructions stored in memory for performing the methods and process discussed herein.

The system may output the information, specifically, document image information, to an external computing device, such as device, or to another output device, such as a display device, such as a screen, or a hardcopy output device, such as a printer, or the like, or to a remote memory storage device. The source/output device may be connected directly with the system or linked thereto, e.g., via a wired or wireless link, such as a local area network or wide area network, such as the Internet. In some embodiments, the information output of the system is stored in memory for further processing, in which content of the document page is labeled or otherwise processed, using the identified structures as input information. The system may generate a graphical user interface (GUI) for display to a user. The exemplary GUI may enable a user to interact with the system via a display screen with a user input device, such as a cursor control device, keyboard, keypad, joystick, touchscreen, or the like. In one exemplary embodiment the display screen 670 is linked to the client computing device and client device includes a web browser which allows the user to interact with the apparatus.

The term "software" as used herein is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so called "firmware" that is software stored on a ROM or so forth. Such software may be organized in various ways, and may include software components organized as libraries, Internet based programs stored on a remote server or so forth, source code, interpretive code, object code, directly executable code, and so forth. It is contemplated that the software may invoke system level code or calls to other software residing on a server or other location to perform certain functions.

The illustrated instructions for performing the method may be in the form of hardware or a combination of hardware and software. As will be appreciated, the system may include fewer or more components while still having the same functionality. For example, components may be combined to form fewer components, or may be functionally separated to form more individual components. These components are best understood with reference to the exemplary described method, which, in part, is described with reference to FIGS. 1-16.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

A machine-readable medium includes any mechanism for storing or transmitting information in a form readable by a machine (e.g., a computer). For instance, a machine-readable medium includes read only memory ("ROM"); random access memory ("RAM"); magnetic disk storage media; optical storage media; flash memory devices; and electrical, optical, acoustical or other form of propagated signals (e.g., carrier waves, infrared signals, digital signals, etc.), just to mention a few examples.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A computer implemented method of generating a page frame sequential hierarchical structure associated with a sequence of pages associated with a digital version of a document comprising:
    a) obtaining a sequence of pages representing the document;
    b) defining a set of page frame features associated with each page of the sequence of pages, each page frame feature defined by a feature value type;
    c) computing a set of feature values associated with the set of page frame features for each page of the sequence;
    d) generating a set of n-grams from the sequence of pages, an n-gram including an ordered sequence of n page frame features provided by a sequence of n pages;
    e) electing sequential n-grams from the set of n-grams, the sequential n-grams defined as similar contiguous n-grams;

f) selecting the most frequent sequential n-gram from the elected sequential n-grams; and g) generating a new sequence of the pages by matching the selected most frequent sequential n-gram against the sequence of pages associated with the document, replacing matched pages of the sequence of pages with a respective node, and associating the matched pages of the sequence of pages as children of the respective node, the new sequence of pages representing the page frame hierarchical sequential structure associated with the document.

2. The computer implemented method according to claim 1, further comprising:

h) iteratively repeating steps d)-g) on the new sequence of pages generated in step g) until all sequential n-grams associated with the sequence of pages are matched against the sequence of pages associated with the document, the respective matched pages of the sequence of pages are replaced with a respective node, and the respective matched pages of the sequence of pages are associated as children of the respective node.

3. The computer implemented method according to claim 1, wherein steps d)-g) are iteratively repeated for the new sequence of the pages as long as step f) can select a most frequent sequential n-gram from the elected sequential n-grams.

4. The computer implemented method according to claim 2, wherein step d) comprises:

d1) calibrating the set of page frame feature values for each page of the sequence by assigning equal feature values to page frame features which are fuzzily equal; and d2) generating a set of n-grams from the sequence of pages and calibrated set of page frame feature values, an n-gram including an ordered sequence of n page frame features provided by a sequence of n pages.

5. The computer implemented method according to claim 1, wherein fuzzily equal page frame feature values are associated with feature values which are within a pre-determined range of value differences and a most frequent feature value is considered a canonical feature value for the page frame features which are fuzzily equal.

6. The computer implemented method according to claim 1, wherein step g) comprises:

g1) matching the selected most frequent sequential n-gram against the sequence of pages to determine all sub-sequences of n contiguous page frames which are matched by the selected n-gram;

g2) enriching the determined sub-sequences by generating n-grams for each sub-sequence; and g3) generating a new sequence of page frames by replacing each sub-sequence of contiguous matched page frames with a respective node and associating the matched page frames of the sequence of page frames as children of the respective node.

7. The computer implemented method according to claim 1, step d) comprising:

d1) calibrating the set of page frame feature values for each page of the sequence by assigning equal feature values to page frame features which are fuzzily equal; and d2) generating a set of n-grams from the sequence of page frames and calibrated set of page frame feature values, an n-gram including an ordered sequence of n page frame features provided by a sequence of n pages;

step g) comprising:

g1) matching the selected most frequent sequential n-gram against the sequence of pages to determine all sub-sequences of n contiguous pages which are matched by the selected n-gram;

g2) enriching the determined sub-sequences by generating n-grams for each sub-sequence; and g3) generating a new sequence of pages by replacing each sub-sequence of contiguous matched elements with a respective node and associating the matched pages of the sequence of pages as children of the respective node; and h) iteratively repeating steps d)-g) on the new sequence of pages generated in step g) until all sequential n-grams associated with the sequence of pages are matched against the sequence of pages associated with the document, the respective matched pages of the sequence of pages are replaced with a respective node, and the respective matched pages of the sequence of pages are associated as children of the respective node.

8. The computer implemented method according to claim 1, wherein the page frame features include a bounding box height, a bounding box width, a left margin, a right margin, a top margin and a bottom margin.

9. The computer implemented method according to claim 1, further comprising:

h) generating a page frame object associated with each page, the page frame fields representing one or more of width, left margin, right margin, height, top margin and bottom margin.

10. The computer implemented method according to claim 9, further comprising:

i) performing steps d)-g), wherein the page frame features are the page frame objects generated in step h).

11. The computer implemented method according to claim 1, further comprising:

associating with each page of the document a coordinate system and associated origin based on the page frame hierarchical structure including page frame feature values.

12. The computer method according to claim 1, further comprising:

h) generating a page frame object associated with each page, the page frame fields representing one or more of width, left margin, right margin, height, top margin and bottom margin; and associating with each page of the document a coordinate system and associated origin based on the page frame hierarchical structure including page frame object values.

13. An image processing system comprising:

a controller configured to receive a digital version of a document, the controller configured to execute instructions to perform a method of generating a page frame hierarchical sequential structure associated with a digital version of the document comprising:

a) obtaining a sequence of pages representing the document;

b) defining a set of page frame features associated with each page of the sequence of pages, each page frame feature defined by a feature value type;

c) computing a set of feature values associated with the set of page frame features for each page of the sequence;

d) generating a set of n-grams from the sequence of pages, an n-gram including an ordered sequence of n page frame features provided by a sequence of n pages;

e) electing sequential n-grams from the set of n-grams, the sequential n-grams defined as similar contiguous n-grams;

f) selecting the most frequent sequential n-gram from the elected sequential n-grams; and g) generating a new sequence of the pages by matching the selected most frequent sequential n-gram against the sequence of pages associated with the document, replacing matched pages of the sequence of pages with a respective node, and associating the matched pages of the sequence of pages as children of the respective node, the new sequence of pages representing the page frame hierarchical sequential structure associated with the document.

14. The image processing system according to claim 13, the controller configured to execute instructions to perform the method further comprising:

h) iteratively repeating steps d)-g) on the new sequence of pages generated in step g) until all sequential n-grams associated with the sequence of pages are matched against the sequence of pages associated with the document, the respective matched pages of the sequence of pages are replaced with a respective node, and the respective matched pages of the sequence of pages are associated as children of the respective node.

15. The image processing system according to claim 14, wherein step d) comprises:

d1) calibrating the set of page frame feature values for each page of the sequence by assigning equal feature values to page frame features which are fuzzily equal; and d2) generating a set of n-grams from the sequence of pages and calibrated set of page frame feature values, an n-gram including an ordered sequence of n page frame features provided by a sequence of n pages.

16. The image processing system according to claim 13, step d) comprising:

d1) calibrating the set of page frame feature values for each page of the sequence by assigning equal feature values to page frame features which are fuzzily equal; and d2) generating a set of n-grams from the sequence of pages and calibrated set of page frame feature values, an n-gram including an ordered sequence of n page frame features provided by a sequence of n pages;

step g) comprising:

g1) matching the selected most frequent sequential n-gram against the sequence of pages to determine all sub-sequences of n contiguous pages which are matched by the selected n-gram;

g2) enriching the determined sub-sequences by generating n-grams for each sub-sequence; and g3) generating a new sequence of pages by replacing each sub-sequence of contiguous matched pages with a respective node and associating the matched pages of the sequence of pages as children of the respective node; and h) iteratively repeating steps d)-g) on the new sequence of pages generated in step g) until all sequential n-grams associated with the sequence of pages are matched against the sequence of pages associated with the document, the respective matched pages of the sequence of pages replaced with a respective node and the respective matched pages of the sequence of pages associated as children of the respective node.

17. The image processing system according to claim 13, wherein the page frame features include a bounding box height, a bounding box width, a left margin, a right margin, a top margin and a bottom margin.

18. The image processing system according to claim 13, further comprising:

h) generating a page frame object associated with each page, the page frame fields representing one or more of width, left margin, right margin, height, top margin and bottom margin.

19. The image processing system according to claim 13, further comprising:

associating with each page of the document a coordinate system and associated origin based on the page frame hierarchical structure including page frame feature values.

20. The image processing system of claim 13, further comprising:

h) generating a page frame object associated with each page, the page frame fields representing one or more of width, left margin, right margin, height, top margin and bottom margin; and associating with each page of the document a coordinate system and associated origin based on the page frame hierarchical structure including page frame object values.

21. A computer program product comprising a non-transitory recording medium storing instructions, which when executed on a computer cause the computer to perform a method of generating a page frame hierarchical sequential structure associated with a digital version of a document comprising:

a) obtaining a sequence of pages representing the document;

b) defining a set of page frame features associated with each page of the sequence of pages, each page frame feature defined by a feature value type;

c) computing a set of feature values associated with the set of page frame features for each page of the sequence;

d) generating a set of n-grams from the sequence of pages, an n-gram including an ordered sequence of n page frame features provided by a sequence of n page frames;

e) electing sequential n-grams from the set of n-grams, the sequential n-grams defined as similar contiguous n-grams;

f) selecting the most frequent sequential n-gram from the elected sequential n-grams; and g) generating a new sequence of the pages by matching the selected most frequent sequential n-gram against the sequence of pages associated with the document, replacing matched pages of the sequence of pages with a respective node, and associating the matched pages of the sequence of pages as children of the respective node, the new sequence of pages representing the page frame hierarchical sequential structure associated with the document.

22. The computer program product according to claim 21, the method further comprising:

h) iteratively repeating steps d)-g) on the new sequence of pages generated in step g) until all sequential n-grams associated with the sequence of pages are matched against the sequence of pages associated with the document, the respective matched pages of the sequence of pages are replaced with a respective node, and the respective matched pages of the sequence of pages are associated as children of the respective node.

23. The computer program product according to claim 22, wherein step d) comprises:
- d1) calibrating the set of page frame feature values for each page of the sequence by assigning equal feature values to page name features which are fuzzily equal; and
- d2) generating a set of n-grams from the sequence of pages and calibrated set of page frame feature values, an n-gram including an ordered sequence of n page frame features provided by a sequence of n pages.

24. The computer program product according to claim 23, wherein step g) comprises:
- g1) matching the selected most frequent sequential n-gram against the sequence of pages to determine all sub-sequences of n contiguous pages which are matched by the selected n-gram;
- g2) enriching the determined sub-sequences by generating n-grams for each sub-sequence; and
- g3) generating a new sequence of pages by replacing each sub-sequence of contiguous matched pages with a respective node and associating the matched pages of the sequence of pages as children of the respective node.

25. The computer program product according to claim 21, wherein the page frame features include a bounding box height, a bounding box width, a left margin, a right margin, a top margin and a bottom margin.

* * * * *